United States Patent
Baudin et al.

(10) Patent No.: US 9,300,350 B2
(45) Date of Patent: Mar. 29, 2016

(54) TRANSCEIVER DEVICE ADAPTED TO OPERATE IN A FIRST COMMUNICATION MODE AND A SECOND COMMUNICATION MODE

(71) Applicant: BROADCOM CORPORATION, Irvine, CA (US)

(72) Inventors: Pierre Baudin, Rennes (FR); Larbi Azzoug, Cesson Sevigne (FR)

( * ) Notice: Subject to any disclaimer, the term of this patent is extended or adjusted under 35 U.S.C. 154(b) by 0 days.

(21) Appl. No.: 14/429,427

(22) PCT Filed: Sep. 26, 2012

(86) PCT No.: PCT/IB2012/002217
§ 371 (c)(1),
(2) Date: Mar. 19, 2015

(87) PCT Pub. No.: WO2014/049381
PCT Pub. Date: Apr. 3, 2014

(65) Prior Publication Data
US 2015/0236747 A1    Aug. 20, 2015

(51) Int. Cl.
*H04B 1/38* (2015.01)
*H04L 5/16* (2006.01)
*H04B 1/401* (2015.01)
*H04B 1/44* (2006.01)
*H04B 1/52* (2015.01)

(52) U.S. Cl.
CPC .................. *H04B 1/401* (2013.01); *H04B 1/44* (2013.01); *H04B 1/52* (2013.01)

(58) Field of Classification Search
CPC ............ H04B 1/401; H04B 1/52; H04B 1/44; H04B 1/006; H04B 1/0057; H01P 1/15; H01P 1/213

USPC ............. 375/220, 219, 222; 455/73; 333/103, 333/101; 370/280
See application file for complete search history.

(56) References Cited

U.S. PATENT DOCUMENTS

| | | | |
|---|---|---|---|
| 2011/0204991 A1* | 8/2011 | Rao | H01P 1/213 333/101 |
| 2012/0294205 A1* | 11/2012 | Fan | H04B 1/0057 370/280 |
| 2014/0295775 A1* | 10/2014 | Rousu | H04B 1/006 455/73 |
| 2015/0145614 A1* | 5/2015 | Whitefield | H01P 1/15 333/103 |

* cited by examiner

*Primary Examiner* — Phuong Phu
(74) *Attorney, Agent, or Firm* — Oblon, McClelland, Maier & Neustadt, L.L.P.

(57) ABSTRACT

A transceiver device comprises a transmitter part, a receiver part and a multiple throw switch, said transceiver device being adapted to operate in a first communication mode and a second communication mode that differs from the first communication mode in that a first frequency desensitizing the receiver part of the transceiver device is expected to be present in the second communication mode. The multiple throw switch is configured such that a pole is connected to a first throw in the first communication mode and to a second throw in the second communication mode. The transceiver device further comprises: a wave multiplexing-demultiplexing device connected to the first throw of the multiple throw switch; a first piece of hardware connected, on one side, to the second throw of the multiple throw switch and, on the other side, to an interface of the wave multiplexing-demultiplexing device dedicated to either high-band signals or to low-band signals, wherein said first piece of hardware is adapted to bypass the wave multiplexing-demultiplexing device in the first communication mode and to trap the first frequency in the second communication mode.

17 Claims, 5 Drawing Sheets

TRANSCEIVER DEVICE ADAPTED TO OPERATE IN A FIRST COMMUNICATION MODE AND A SECOND COMMUNICATION MODE

The present invention generally relates to a transceiver device comprising a transmitter part, a receiver part and a multiple throw switch, said transceiver device being adapted to operate in a first communication mode and in a second communication mode distinct from the first communication mode in that, in the second communication mode, a frequency desensitizing the receiver part of the transceiver device is expected to be present.

In wireless telecommunications systems, some transceiver devices are able to transmit and receive signals at the same time using a single antenna. A duplexer is implemented in order to perform isolation between receiver and transmitter parts of the transceiver device, while permitting said receiver and transmitter parts to share the common antenna.

Figure 1:
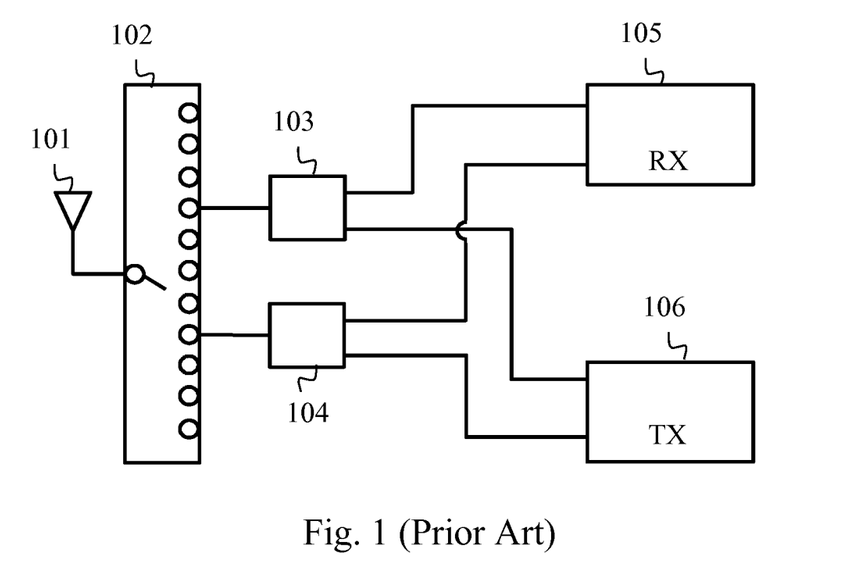
FIG. 1 schematically represents a state of the art front-end architecture of a transceiver device.

FIG. 1 schematically represents a state of the art front-end architecture of a transceiver device. The transceiver device comprises an antenna 101 shared by a receiver part 105 and a transmitter part 106 of the transceiver device. The transceiver device comprises a multiple throw switch, such as a Single Pole Multiple Throw (SPxT) switch 102. The antenna 101 is connected to the single pole of the SPxT switch 102. One throw of the SPxT switch 102 is connected to a high-band duplexer 103 and one other throw of the SPxT switch 102 is connected to a low-band duplexer 104. The receiver part 105 is connected to the high-band duplexer 103 and the low-band duplexer 104. The transmitter part 106 is also connected to the high-band duplexer 103 and the low-band duplexer 104.

The SPxT switch 102 allows connecting front-end units processing different frequency bands to the same antenna 101. The remaining throws of the SPxT switch 102 might be connected to other transmitter or receiver parts in order to allow the transceiver device to implement respective other radio communication protocols.

Considering that the transceiver device is of user equipment (UE) type, the architecture shown in FIG. 1 allows, on one hand thanks to the high-band duplexer 103, the transmitter part 106 to transmit signals in a part of a high frequency band reserved for uplink communications and the receiver part 105 to receive signals in a part of the high frequency band reserved for downlink communications; and, on the other hand, the architecture shown in FIG. 1 allows the transmitter part 106 to transmit signals in a part of a low frequency band reserved for uplink communications and the receiver part 105 to receive signals in a part of the low frequency band reserved for downlink communications. Such a frequency division duplex (FDD) architecture is for instance implemented in a context of 3G ("3$^{rd}$ Generation") UMTS ("Universal Mobile Telecommunications System") or LTE ("Long-Term Evolution") 3GPP technologies.

In a variant, considering that the transceiver device is of base station type, the transmitter part 106 is associated to downlink communications and the receiver part 105 to uplink communications.

A high frequency band, also simply referred to as high band, corresponds to a spectrum portion that is above a given threshold; and a low frequency band, also simply referred to as low band, corresponds to a spectrum portion that is below such given threshold. For instance, considering the worldwide licensed 3G/LTE frequency bands, such a threshold can be considered equal to 1.6 Ghz. Other values of said given threshold can however be used. In this case, the high band is for instance the band B4, wherein the uplink communications are set up in the range from 1.710 GHz to 1.755 GHz and the downlink communications are set up in the range from 2.110 GHz to 2.155 GHz; the low band is for instance the band B5, wherein the uplink communications are set up in the range from 824 MHz to 849 MHz and the downlink communications are set up in the range from 869 MHz to 894 MHz.

Frequency spectrum parts respectively used for uplink and downlink communications are usually far enough from each other to permit the duplexer to perform the aforementioned isolation, but close enough to each other to avoid that harmonics of a carrier frequency used by the transmitter part would generate desensitization of the receiver part.

According to a first desensitization situation, desensitization of the receiver part 105 may occur when a harmonic of the carrier frequency used by the transmitter part 106 corresponds to a carrier frequency used by the receiver part 105. It further means that, according to a second desensitization situation, desensitization of the receiver part 105 may occur when the carrier frequency used by the transmitter part 106, or a harmonic of said carrier frequency, corresponds to a pre-defined frequency known to desensitize the receiver part 105, such as a spurious response frequency of the receiver part 105. In particular, considering direct conversion receivers, such spurious response frequency can typically correspond to a harmonic of a nominal frequency of a local oscillator of the receiver part 105, i.e. the carrier frequency used by the receiver part 105. In said first desensitization situation, the desensitization is said to be direct desensitization; and in said second desensitization situation, desensitization occurs due to harmonic local oscillator mixing problems, i.e. the carrier frequency used by the transmitter part 105, or a harmonic thereof, corresponds to a harmonic of the nominal frequency of the local oscillator of the receiver part 105.

One may notice that, as far UMTS and LTE technologies are implemented, uplink and downlink communications could occur simultaneously without such desensitization issues, by using off-the-shelf duplexers with typical performance. However, emerging 3GPP LTE-Advanced technology introduces downlink carrier aggregation principles, which means that a transceiver device should be able to receive signals on two carriers even in two distinct frequency bands. When the two carriers are in two distinct bands, the carrier aggregation is called inter-band carrier aggregation. This may lead to the aforementioned desensitization situations. For instance, referring to the worldwide licensed 3G/LTE frequency bands, the first desensitization situation occurs when the transmitter part 106 transmits signals at the frequency band B17 and the receiver part 105 receives signals at the frequency band B4 and at the frequency band B17. Similarly, the second desensitization situation occurs when the transmitter part 106 transmits signals at the frequency band B4 and the receiver part 105 receives signals at the frequency band B5 and at the frequency band B4 in a direct conversion receiver scheme. Similar desensitization issues can occur for instance with the frequency bands B3 and B5, and B3 and B19.

It should be noted that similar desensitization situations might occur in case of uplink carrier aggregation.

Similar desensitization issues further occur when the receiver part has to cope with interfering signals generally referred to as blockers, for instance generated by other nearby transmission systems. A blocker refers to an interfering signal. Among all the blockers a receiver has to cope with, the ones laying at the spurious response frequencies of the receiver are probably the most problematic.

It is desirable to overcome the aforementioned drawbacks of the state of the art.

It is more particularly desirable to provide a solution that allows a transceiver device to efficiently receive signals, whether or not at least one frequency desensitizing a receiver part of the transceiver device is expected to be present.

It is more particularly desirable to provide a solution that allows a transceiver device to efficiently operate in two communication modes, wherein in one of the communication mode, at least one frequency desensitizing a receiver part of the transceiver device is expected to be present.

It is more particularly desirable to provide a solution that allows a transceiver device to efficiently receive signals, whether or not there is a harmonic relationship between a carrier frequency used by a transmitter part of the transceiver device and a carrier frequency of said received signals.

It is more particularly desirable to provide a solution that allows a transceiver device to efficiently receive signals, whether or not there is a blocker interfering with a carrier frequency, or a harmonic thereof, used by a receiver part of the transceiver device.

It is furthermore desirable to provide a solution that is simple and cost-effective.

It is furthermore desirable to provide a solution that relies on an adaptation of the architecture shown in FIG. 1 for achieving the objectives set forth above.

To that end, the present invention concerns a transceiver device comprising a transmitter part, a receiver part and a single pole multiple throw switch, said transceiver device being adapted to operate in a first communication mode and in a second mode. The second communication mode differs from the first communication mode in that a first frequency desensitizing the receiver part of the transceiver device is expected to be present in the second communication mode. Furthermore, the multiple throw switch is configured such that a pole is connected to a first throw in the first communication mode and to a second throw in the second communication mode, and said transceiver device further comprises: a wave multiplexing-demultiplexing device connected to the first throw of the multiple throw switch; and a first piece of hardware connected, on one side, to the second throw of the multiple throw switch and, on the other side, to an interface of the wave multiplexing-demultiplexing device dedicated to either high-band signals or to low-band signals, wherein said first piece of hardware is adapted to bypass the wave multiplexing-demultiplexing device in the first communication mode and to trap the first frequency in the second communication mode.

Thus, the transceiver device efficiently operates in the two communication modes, although, in the second communication mode, a frequency desensitizing the receiver part of the transceiver device is expected to be present. Moreover, the transceiver device is simple to implement and is cost-effective.

The characteristics of the invention will emerge more clearly from a reading of the following description of an example of embodiment, said description being produced with reference to the accompanying drawings, among which.

Whereas the invention is more particularly described hereafter in a context of a carrier aggregation mechanism, the same principles apply more generally in a context of a transceiver device in which two communication modes coexist, wherein a frequency desensitizing a receiver part of the transceiver device is expected to be present in one of the communication modes. Such expected desensitizing frequency can be related to a harmonic relationship between a carrier frequency used by a transmitter part of the transceiver device and a predefined frequency known as desensitizing the receiver part of the transceiver device, such as a spurious response frequency of the receiver part of the transceiver device. Such expected desensitizing frequency can also be related to a blocker laying at said predefined frequency.

FIGS. 2, 3, 4, 5, 6 and 8 schematically represent plural respective embodiments of a front-end architecture of a transceiver device according to the present invention. Preferably, the transceiver device is a mobile station, also referred to as user equipment. Alternatively, the transceiver device may also be a modem device, which may be installed as part of a mobile station or user equipment, but may be also a separate module, which can be attached to various devices for providing those devices with capability to communicate wirelessly. The transceiver device according to the invention may provide communication capability to any suitable device, such as a computer device, a machine, for example, a vending machine, or a vehicle like a car or truck, where the transceiver device may be installed for this purpose. In a variant, the transceiver device is a base station.

The front-end architecture of any of these three embodiments is adapted to operate in either one of the two following communication modes:
  a first communication mode, in which there is no expected presence of at least one frequency desensitizing a receiver part of the transceiver device; and
  a second communication mode, in which there is an expected presence of at least one frequency desensitizing the receiver part of the transceiver device.

In a preferred embodiment, the first communication mode corresponds to uplink and downlink transmissions in complementary portions of a same frequency band, and the second communication mode corresponds to downlink and/or uplink carrier aggregation using distinct frequency bands.

In one embodiment, the expected presence of a frequency desensitizing the receiver part of the transceiver device is related to a situation where there is a harmonic relationship between a carrier frequency used by a transmitter part of the transceiver device and a carrier frequency used by the receiver part.

In another embodiment, the expected presence of a frequency desensitizing the receiver part of the transceiver device is related to a situation where the transmitter part transmits a signal including a predefined frequency desensitizing the receiver part.

In another embodiment, the expected presence of a frequency desensitizing the receiver part of the transceiver device is related to a presence of a blocker laying at a predefined frequency. Desensitizing blockers typically lay at spurious response frequencies of the receiver part. However, in full duplex systems as in 3G or LTE, blockers might lay at other characteristic frequencies, for instance at a frequency that is equal to the sum of a carrier frequency used by the transmitter part 106 and a carrier frequency used by the receiver part 105, which can inter-modulate with signals transmitted by the transmitter part 106 through nonlinearities and desensitizing the receiver part 105.

The front-end architecture of any of the embodiments shown in FIGS. 2, 3, 4, 5, 6 and 8 comprises the antenna 101, a multiple throw switch, such as the SPxT switch 102. The front-end architecture further comprises the receiver part 105 and the transmitter part 106, already introduced with regard to FIG. 1. According to the considered embodiment, the transceiver device comprises the high-band duplexer 103 and/or the low-band duplexer 104 also already introduced with regard to FIG. 1. The interconnections of these items of the transceiver device differ from the state of the art architecture shown in FIG. 1 in a way as described hereafter.

Alternatively, a transceiver may also have multiple antennas, where different antennas may be optimized for different use scenarios. The multiple throw switch 102 may then be implemented in various ways, i.e. it may have multiple poles, without departing from the invention.

Figure 4:
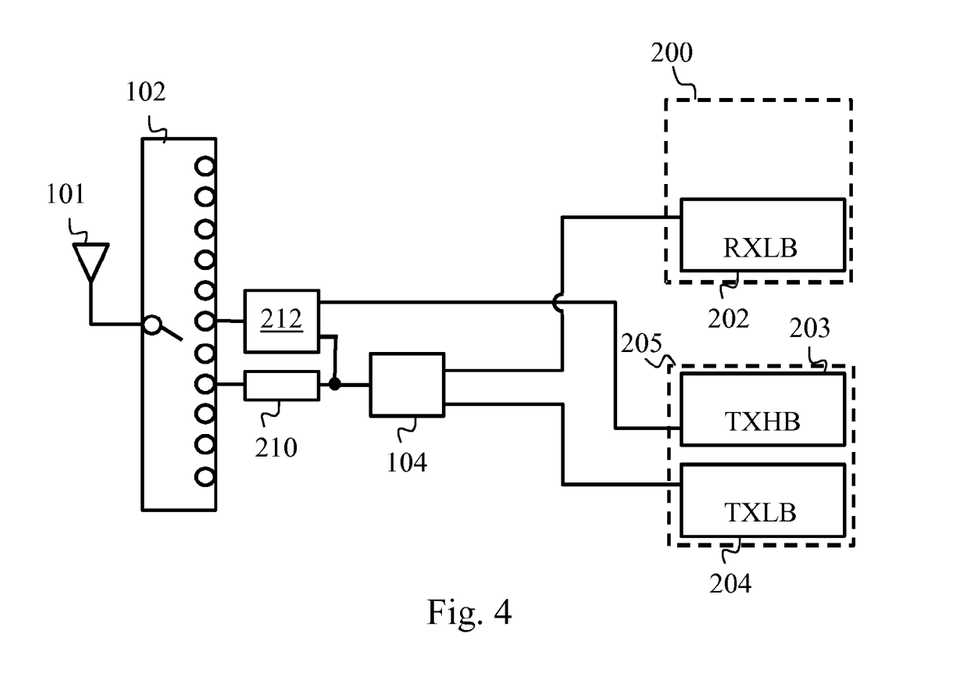
FIG. 4 schematically represents a third embodiment of the front-end architecture of the transceiver device, according to the present invention.
Figure 5:
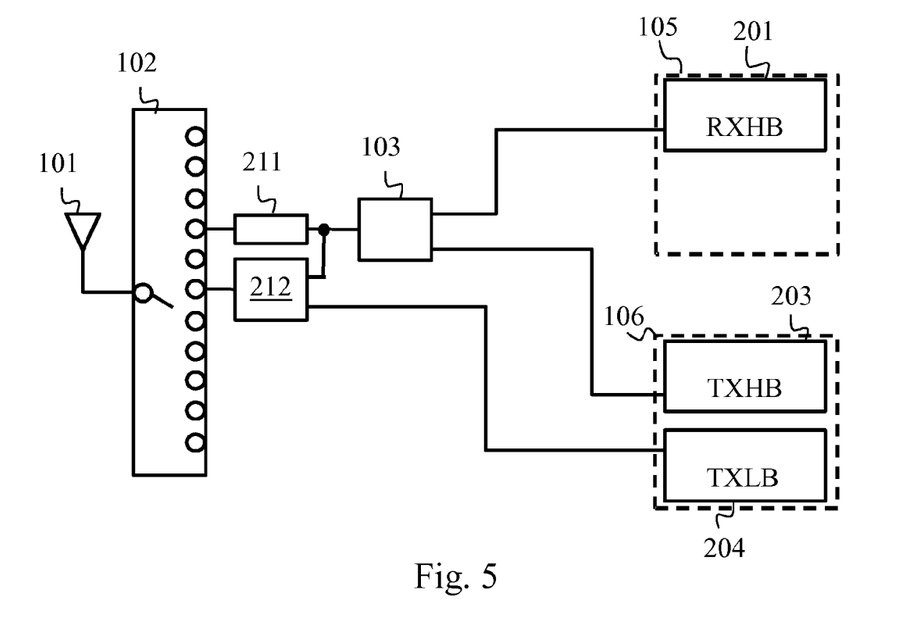
FIG. 5 schematically represents a fourth embodiment of the front-end architecture of the transceiver device, according to the present invention.
Figure 6:
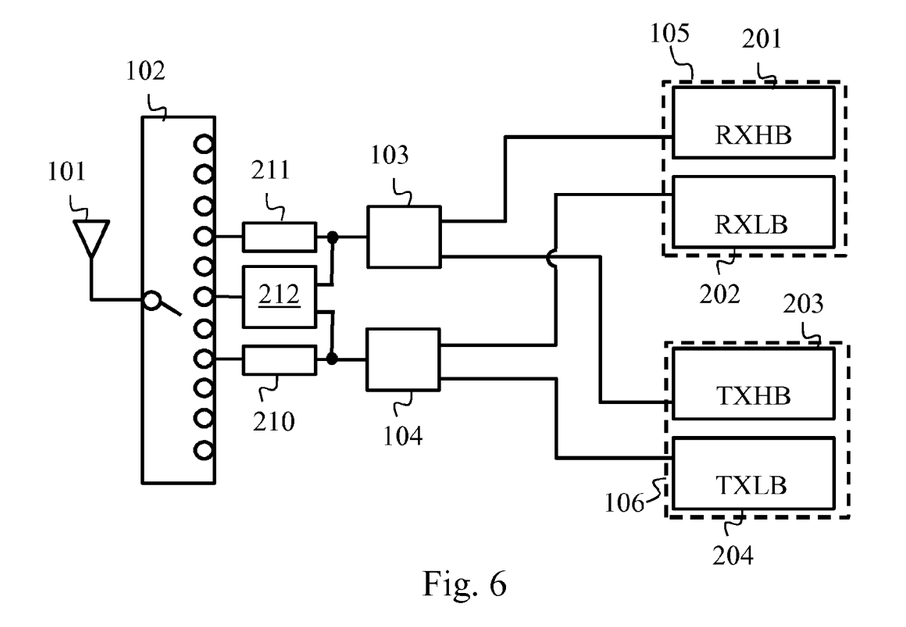
FIG. 6 schematically represents a fifth embodiment of the front-end architecture of the transceiver device, according to the present invention.
Figure 8:
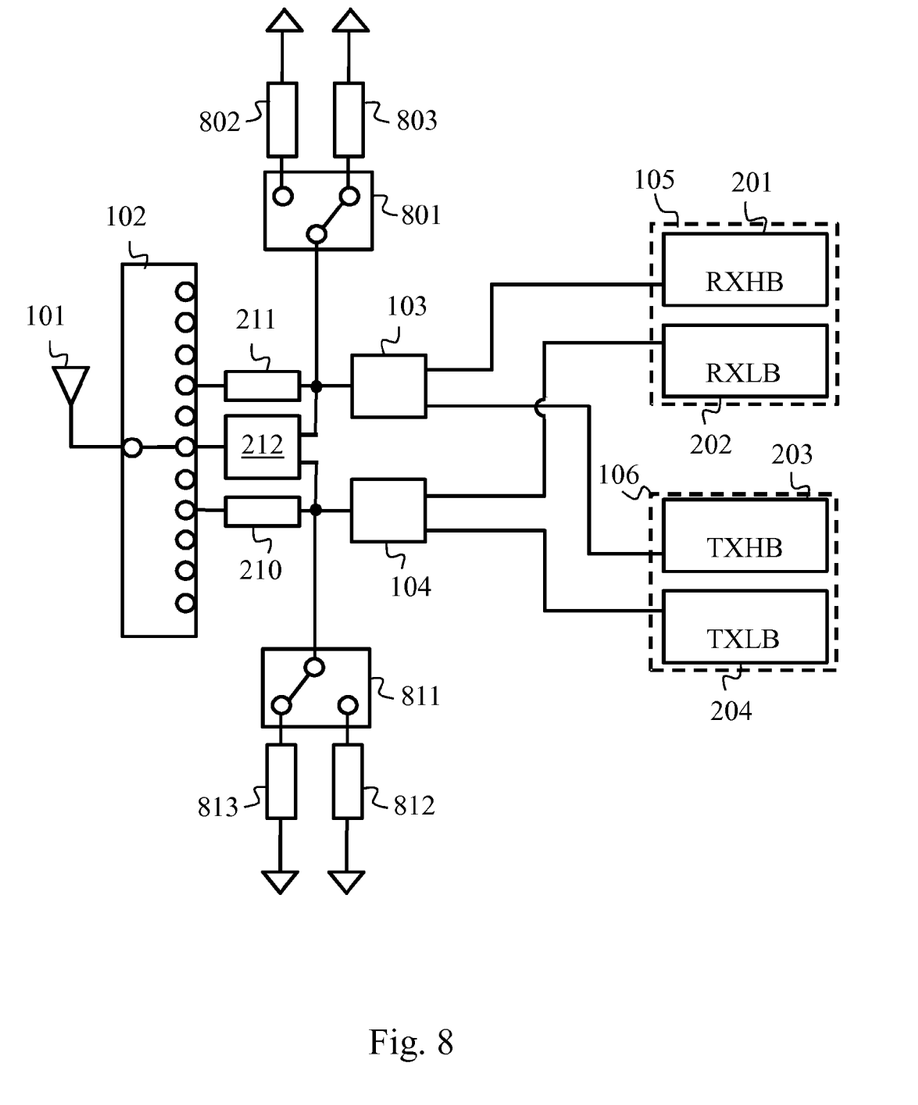
FIG. 8 schematically represents a sixth embodiment of the front-end architecture of the transceiver device according to the present invention.

In should be noted that the SPxT switch 102 can be a switch with two throws in the architectures shown in FIGS. 2, 3, 4, 5 and can be a switch with three throws in the architectures shown in FIGS. 6 and 8.

To enable transmission and/or reception of signals at different frequency bands simultaneously using a single antenna, a wave multiplexing-demultiplexing device 212 is placed between the high-band duplexer 103 and the low-band duplexer 104 on one side, and the SPxT switch 102 on the other side. The wave multiplexing-demultiplexing device 212 may be a diplexer, a triplexer or any other kind of a microwave multiplexing-demultiplexing device capable of multiplexing signals in the frequency domain. It is illustratively considered hereafter that the wave multiplexing-demultiplexing device 212 is a diplexer.

The diplexer 212 is connected to a first throw of the SPxT switch 102. The diplexer 212 is a passive device that implements frequency domain multiplexing in one direction of the signal and demultiplexing in other direction of the signal. Therefore, in the diplexer 212, signals coming from the SPxT switch 102 are demultiplexed into high-band signals transferred via an interface dedicated to high-band signals and into low-band signals transferred via an interface dedicated to low-band signals. Furthermore, signals coming from the high-band duplexer 103 and the low-band duplexer 104 are multiplexed to form signals transferred to the SPxT switch 102.

A first problem caused by adding the diplexer 212 is that, if no other arrangement is made to the transceiver architecture, the performance of the transceiver device in the first communication mode would be lower than for the architecture shown in FIG. 1, as the diplexer introduces insertion loss. A second problem caused by adding the diplexer 212 is that, as the second communication mode introduces a frequency expected to desensitize the receiver part of the transceiver device, then the diplexer 212 would not prevent propagation of this expected desensitizing frequency towards the receiver part 105 and desensitization of the receiver part 105 would effectively occur. In order to simultaneously cope with these two problems, a piece of hardware connects one other throw of the SPxT switch 102 to the interface dedicated to high-band signals or to the interface dedicated to low-band signals of the diplexer 212. Said piece of hardware is adapted to allow bypassing the diplexer 212 when the transceiver device is configured to operate in the first communication mode and to trap the expected desensitizing frequency when the transceiver device is configured to operate in the second communication mode. Therefore, the performance of the transceiver device in the first communication mode would be equivalent with the performance of the architecture shown in FIG. 1. It moreover means that, thanks to this same piece of hardware, desensitization is avoided.

As the piece of hardware is disconnected from the circuitry by the unconnected switch throw in the second communication mode, said piece of hardware appears as a stub in the circuitry.

Said piece of hardware is preferably a line of a Printed Wiring Board (PWB), also referred to as Printed Circuit Board (PCB), said line having a length defined as a function of the expected desensitizing frequency to be trapped. In a variant, said piece of hardware can be any structure which can act as a stub when unconnected from the other end, such as an electrical wire, a transmission line, a microwave guide or a waveguide, the length of which is similarly defined as a function of the expected desensitizing frequency to be trapped. In another variant, said piece of hardware can be any structure which can act as a stub when unconnected from the other end, such as a structure at least comprising one of an electrical wire and a transmission line and a microwave guide and a waveguide, for instance further comprising an arrangement of impedance matching filters and a multiple throw switch as detailed hereafter with regard to FIG. 8. In yet another variant, said piece of hardware is a microstrip filter, which is a cascade of microstrip sections of different characteristic impedances.

For instance, having a high impedance for the second throw when open, i.e. the PWB line appears as disconnected, the length L of the PWB line is estimated as follows:

$$L = \frac{\lambda}{4}$$

wherein λ is the wavelength corresponding to the expected desensitizing frequency. Nevertheless, the exact length L depends on the exact impedance of the throw.

Figure 2:
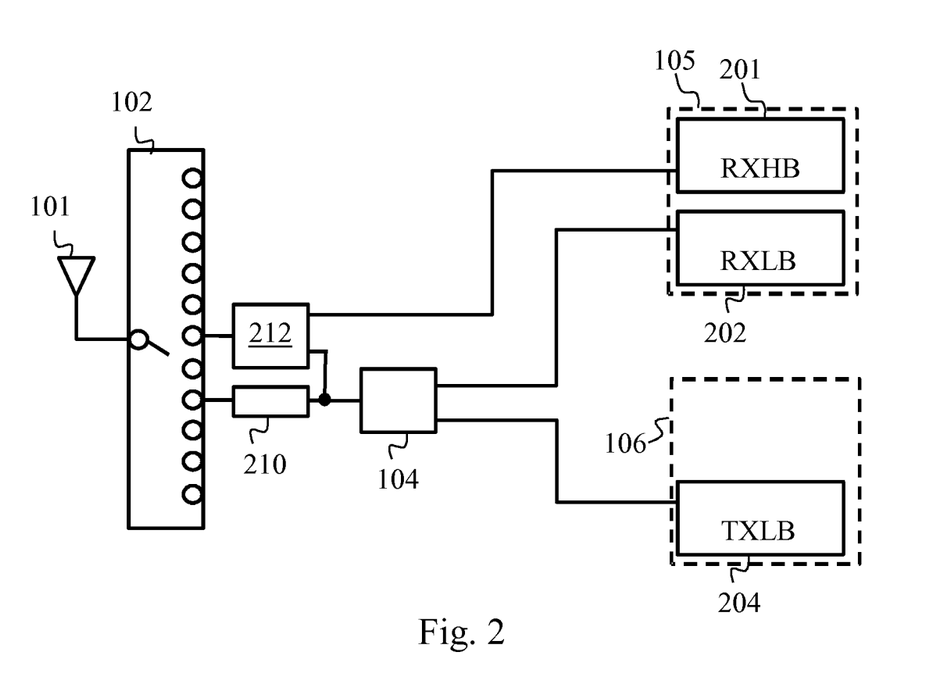
FIG. 2 schematically represents a first embodiment of a front-end architecture of a transceiver device according to the present invention.

FIG. 2 schematically represents a first embodiment of the front-end architecture of the transceiver device.

In the first embodiment, the diplexer 212 is connected to a high-band subpart RXHB 201 of the receiver part 105. The diplexer 212 is further connected to the low-band duplexer 104. The low-band duplexer 104 is further connected to a low-band subpart RXLB 202 of the receiver part 105 and to a low-band subpart TXLB 204 of the transmitter part 106.

Figure 7A:
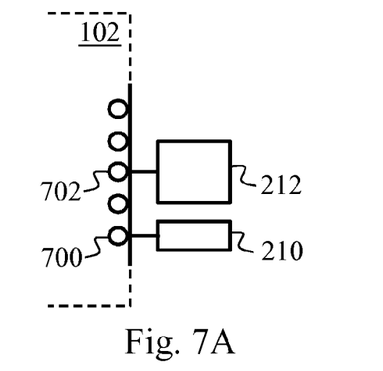
FIG. 7A schematically represents an enlarged view of interfaces of a switch of the transceiver device of FIG. 2 or of FIG. 4.

As shown in FIG. 7A, the diplexer 212 is connected to the SPxT switch 102 to a first throw 702. A second throw 700 of the SPxT switch 102 is used as described hereafter. Therefore, the pole of the SPxT switch 102 is connected to the second throw 700 in the first communication mode, and the pole of the SPxT switch 102 is connected to the first throw 702 in the second communication mode.

A first piece of hardware 210 is connected, on one side to said second throw 700 and, on the other side, to the connection between the diplexer 212 and the low-band duplexer 104, i.e. to the interface of the diplexer 212 dedicated to low-band signals. The first piece of hardware 210 performs bypassing of the diplexer 212 when the transceiver device is configured in the first communication mode and performs trapping of the expected desensitizing frequency in the second communication mode. As already mentioned, the first piece of hardware 210 is preferably a PWB line, the length of which is defined as a function of the expected desensitizing frequency.

According to one example, in the first communication mode, the transceiver device is adapted to transmit toward the antenna 101 signals generated by the low-band subpart TXLB 204 and to receive from the antenna 101 signals intended to the low-band subpart RXLB 202. In the second communication mode, the transceiver device is adapted to transmit toward the antenna 101 signals generated by the low-band subpart TXLB 204 and to receive from the antenna 101 at least signals intended to the high-band subpart RXHB 201. In case of downlink carrier aggregation, the transceiver device is adapted to receive from the antenna 101 signals intended to the high-band subpart RXHB 201 and to the low-band subpart RXLB 202. In this example, a harmonic of the carrier frequency used by the low-band subpart TXLB 204 corresponds to a frequency that is expected to desensitize the high-band subpart RXHB 201, e.g. to a spurious response frequency of the high-band subpart RXHB 201. For instance, the low-band subpart TXLB 204 uses the frequency band B17 for uplink communications, the low-band subpart RXLB 202 uses the frequency band B17 for downlink communications and the high-band subpart RXHB 201 uses the frequency band B4 for downlink communications. The first piece of hardware 210 is then adapted to bypass the diplexer 212 in the first communication mode and, in the second communication mode, to trap said harmonic of the carrier frequency used by the low-band subpart TXLB 204, in order to avoid desensitization.

According to another example, in the first communication mode, the transceiver device is adapted to transmit toward the antenna 101 signals generated by the low-band subpart TXLB 204 and to receive from the antenna 101 signals intended to the high-band subpart RXHB 201. In the second communication mode, the transceiver device is adapted to transmit toward the antenna 101 signals generated by the low-band subpart TXLB 204 and to receive from the antenna 101 at least signals intended to the low-band subpart RXLB 202. In case of downlink carrier aggregation, the transceiver device is adapted to receive from the antenna 101 signals intended to the high-band subpart RXHB 201 and to the low-band subpart RXLB 202. A blocker lays at a frequency that is expected to desensitize the low-band subpart RXLB 202, e.g. at a spurious response frequency of the low-band subpart RXLB 202. The first piece of hardware 210 is then adapted to bypass the diplexer 212 in the first communication mode and to trap said blocker in the second communication mode in order to avoid desensitization.

Figure 3:
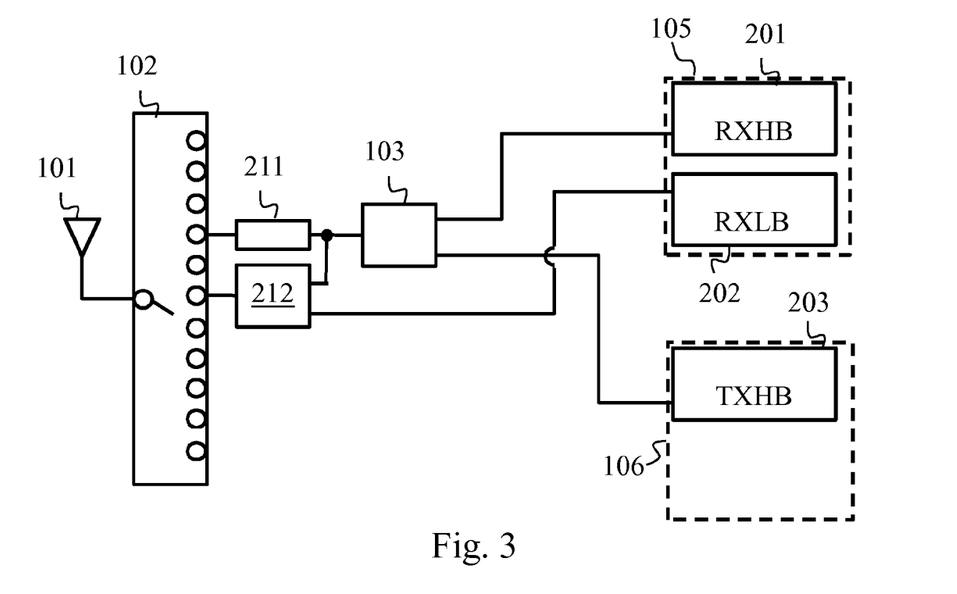
FIG. 3 schematically represents a second embodiment of the front-end architecture of the transceiver device, according to the present invention.

FIG. 3 schematically represents a second embodiment of the front-end architecture of the transceiver device.

In the second embodiment, the diplexer 212 is connected to the low-band subpart RXLB 202 of the receiver part 105. The diplexer 212 is further connected to the high-band duplexer 103. The high-band duplexer 103 is further connected to the high-band subpart RXHB 201 of the receiver part 105 and to the high-band subpart TXHB 203 of the transmitter part 106.

Figure 7B:
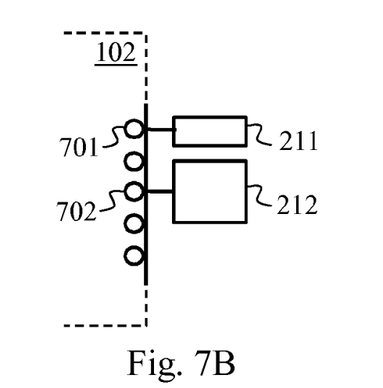
FIG. 7B schematically represents an enlarged view of interfaces of a switch of the transceiver device of FIG. 3 or of FIG. 5.

As shown in FIG. 7B, the diplexer 212 is connected to the SPxT switch 102 to the first throw 702. A third throw 701 of the SPxT switch 102 is used as described hereafter. Therefore, the pole of the SPxT switch 102 is connected to the third throw 701 in the first communication mode, and the pole of the SPxT switch 102 is connected to the first throw 702 in the second communication mode.

A second piece of hardware 211 is connected, on one side, to said third throw 701 and, on the other side, to the connection between the diplexer 212 and the high-band duplexer 104, i.e. to the interface of the diplexer 212 dedicated to high-band signals. The second piece of hardware 211 performs bypassing of the diplexer 212 when the transceiver device is configured in the first communication mode and performs trapping of the expected desensitizing frequency in the second communication mode. As already mentioned, the second piece of hardware 211 is preferably a PWB line of which length is defined as a function of the expected desensitizing frequency.

According to one example, in the first communication mode, the transceiver device is adapted to transmit toward the antenna 101 signals generated by the high-band subpart TXHB 203 and to receive from the antenna 101 signals intended to the high-band subpart RXHB 201. In the second communication mode, the transceiver device is adapted to transmit toward the antenna 101 signals generated by the high-band subpart TXHB 203 and to receive from the antenna 101 at least signals intended to the low-band subpart RXLB 202. In case of downlink carrier aggregation, the transceiver device is adapted to receive from the antenna 101 signals intended to the high-band subpart RXHB 201 and to the low-band subpart RXLB 202. In this example, a harmonic of the carrier frequency used by the high-band subpart TXHB 203 corresponds to a frequency that is expected to desensitize the low-band subpart RXLB 202, e.g. to a spurious response frequency of the low-band subpart RXLB 202. For instance, the second harmonic of the carrier frequency used by the high-band subpart TXHB 203 corresponds to the fifth harmonic of a local oscillator of the low-band subpart RXLB 202 when a direct conversion receiver scheme is implemented, i.e.:

$$2 \times F_{TXHB} = 5 \times F_{RXLB}$$

wherein $F_{TXHB}$ represents the carrier frequency used by the high-band subpart TXHB 203 and $F_{RXLB}$ represents the nominal frequency of the local oscillator of the low-band subpart RXLB 202. The second piece of hardware 211 is then adapted to bypass the diplexer 212 in the first communication mode and, in the second communication mode, to trap said harmonic of the carrier frequency used by the high-band subpart TXHB 203, in order to avoid desensitization.

According to another example, in the first communication mode, the transceiver device is adapted to transmit toward the antenna 101 signals generated by the high-band subpart TXHB 203 and to receive from the antenna 101 signals intended to the low-band subpart RXLB 202. In the second communication mode, the transceiver device is adapted to transmit toward the antenna 101 signals generated by the high-band subpart TXHB 203 and to receive from the antenna 101 at least signals intended to the high-band subpart RXHB 201. In case of downlink carrier aggregation, the transceiver device is adapted to receive from the antenna 101 signals intended to the high-band subpart RXHB 201 and to the low-band subpart RXLB 202. A blocker lays at a frequency that is expected to desensitize the high-band subpart RXHB 201, e.g. a spurious response frequency of the high-band subpart RXHB 201. The second piece of hardware 211 is then adapted to bypass the diplexer 212 in the first communication mode and to trap said blocker in the second communication mode in order to avoid desensitization.

FIG. 4 schematically represents a third embodiment of the front-end architecture of the transceiver device.

In the third embodiment, the diplexer 212 is connected to the high-band subpart TXHB 203 of the transmitter part 106. The diplexer 212 is further connected to the low-band duplexer 104. The low-band duplexer 104 is further connected to the low-band subpart RXLB 202 of the receiver part 105 and to the low-band subpart TXLB 204 of the transmitter part 106.

As shown in FIG. 7A, the diplexer 212 is connected to the SPxT switch 102 to the first throw 702. The pole of the SPxT switch 102 is connected to the second throw 700 in the first communication mode, and to the first throw 702 in the second communication mode. The first piece of hardware 210 is connected, on one side, to said second throw 700 and, on the other side, to the connection between the diplexer 212 and the low-band duplexer 104, i.e. to the interface of the diplexer 212 dedicated to low-band signals. The first piece of hardware 210 allows bypassing the diplexer 212 when the transceiver device is configured in the first communication mode and to trap the expected desensitizing frequency in the second communication mode. As already mentioned, the first piece of hardware 210 is preferably a PWB line, the length of which is defined as a function of the expected desensitizing frequency.

According to one example, in the first communication mode, the transceiver device is adapted to transmit toward the antenna 101 signals generated by the low-band subpart TXLB 204 and to receive from the antenna 101 signals intended to the low-band subpart RXLB 202. In the second communication mode, the transceiver device is adapted to transmit toward the antenna 101 at least signals generated by the high-band subpart TXHB 203 and to receive from the antenna 101 signals intended to the low-band subpart RXLB 202. In case of uplink carrier aggregation, the transceiver device is adapted to transmit toward the antenna 101 signals generated by the high-band subpart TXHB 203 and by the low-band subpart TXLB 204. In this example, the carrier frequency, or a harmonic thereof, used by the high-band subpart TXHB 204 corresponds to a harmonic of the carrier frequency used by the low-band subpart RXLB 202. For instance, the low-band subpart TXLB 204 uses the frequency band B17 for uplink communications, the low-band subpart RXLB 202 uses the frequency band B17 for downlink communications and the high-band subpart TXHB 203 uses the frequency band B4 for uplink communications. The first piece of hardware 210 is then adapted to bypass the diplexer 212 in the first communication mode and, in the second communication mode, to trap the carrier frequency, or said harmonic thereof, used by the high-band subpart TXHB 203 in order to avoid desensitization.

FIG. 5 schematically represents a fourth embodiment of the front-end architecture of the transceiver device.

In the fourth embodiment, the diplexer 212 is connected to the low-band subpart TXLB 204 of the transmitter part 106. The diplexer 212 is further connected to the high-band duplexer 103. The high-band duplexer 103 is further connected to the high-band subpart RXHB 201 of the receiver part 105 and to the high-band subpart TXHB 203 of the transmitter part 106.

As shown in FIG. 7B, the diplexer 212 is connected to the SPxT switch 102 to the first throw 702. The pole of the SPxT switch 102 is connected to the third throw 701 in the first communication mode, and to the first throw 702 in the second communication mode. The second piece of hardware 211 is connected, on one side, to said third throw 701 and, on the other side, to the connection between the diplexer 212 and the high-band duplexer 103, i.e. to the interface of the diplexer 212 dedicated to high-band signals. The second piece of hardware 211 allows bypassing the diplexer 212 when the transceiver device is configured in the first communication mode and to trap the expected desensitizing frequency in the second communication mode. As already mentioned, the second piece of hardware 211 is preferably a PWB line, the length of which is defined as a function of the expected desensitizing frequency.

According to one example, in the first communication mode, the transceiver device is adapted to transmit toward the antenna 101 signals generated by the high-band subpart TXHB 203 and to receive from the antenna 101 signals intended to the high-band subpart RXHB 201. In the second communication mode, the transceiver device is adapted to transmit toward the antenna 101 at least signals generated by the low-band subpart TXLB 204 and to receive from the antenna 101 signals intended to the high-band subpart RXHB 201. In case of uplink carrier aggregation, the transceiver device is adapted to transmit toward the antenna 101 signals generated by the high-band subpart TXHB 203 and by the low-band subpart TXLB 204. In this example, a harmonic of the carrier frequency used by the low-band subpart TXLB 204 corresponds to a harmonic of the carrier frequency used by the high-band subpart RXHB 201. For instance, the fifth harmonic of the carrier frequency used by the low-band subpart TXLB 204 corresponds to the second harmonic of the nominal frequency of a local oscillator of the high-band subpart RXHB 201 when a direct conversion receiver scheme is implemented, i.e.:

$$5 \times F_{TXLB} = 2 \times F_{RXHB}$$

wherein $F_{TXLB}$ represents the carrier frequency used by the low-band subpart TXLB 204 and $F_{RXHB}$ represents the nominal frequency of the local oscillator of the high-band subpart RXHB 201. The second piece of hardware 211 is then adapted to bypass the diplexer 212 in the first communication mode and, in the second communication mode, to trap said harmonic of the carrier frequency used by the low-band subpart TXLB 204 in order to avoid desensitization.

FIG. 6 schematically represents a fifth embodiment of the front-end architecture of the transceiver device.

In the fifth embodiment, the diplexer 212 is connected to the high-band duplexer 103 and to the low-band duplexer 104. The high-band duplexer 103 is further connected to the high-band subpart RXHB 201 of the receiver part 105 and to the high-band subpart TXHB 203 of the transmitter part 106. The low-band duplexer 104 is further connected to the low-band subpart RXLB 202 of the receiver part 105 and to the low-band subpart TXLB 204 of the transmitter part 106.

Figure 7C:
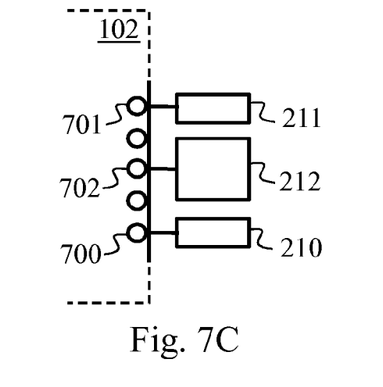
FIG. 7C schematically represents an enlarged view of interfaces of a switch of the transceiver device of FIG. 6.

As shown in FIG. 7C, the diplexer 212 is connected to the SPxT switch 102 to the first throw 702.

The pole of the SPxT switch 102 is connected to the second throw 700 in the first communication mode, and to the first throw 702 in the second communication mode. The first piece of hardware 210 is connected, on one side, to said second throw 700 and, on the other side, to the connection between the diplexer 212 and the low-band duplexer 104, i.e. to the interface of the diplexer 212 dedicated to low-band signals. The first piece of hardware 210 allows bypassing the diplexer 212 when the transceiver device is configured in the first communication mode and to trap a first expected desensitizing frequency in the second communication mode. Similarly as already described, the first piece of hardware 210 is preferably a PWB line, the length of which is defined as a function of the first expected desensitizing frequency.

The pole of the SPxT switch 102 is further connected to the third throw 701 in a third communication mode. The third communication mode is similar to the first communication mode in that there is no expected use of a frequency desensitizing the receiver part 105 of the transceiver device. The second piece of hardware 211 is connected, on one side, to said third throw 701 and, on the other side, to the connection between the diplexer 212 and the high-band duplexer 103, i.e. to the interface of the diplexer 212 dedicated to high-band signals. The second piece of hardware 211 allows bypassing the diplexer 212 when the transceiver device is configured in the third communication mode and to trap a second expected desensitizing frequency in the second communication mode. As already mentioned, the second piece of hardware 211 is preferably a PWB line of which length is defined as a function of the second expected desensitizing frequency.

According to one example, in the first communication mode, the transceiver device is adapted to transmit toward the antenna 101 signals generated by the low-band subpart TXLB 204 and to receive from the antenna 101 signals intended to the low-band subpart RXLB 202. In the third communication mode, the transceiver device is adapted to transmit toward the antenna 101 signals generated by the high-band subpart TXHB 203 and to receive from the antenna 101 signals intended to the high-band subpart RXHB 201. In the second communication mode, the transceiver device is adapted to transmit toward the antenna 101 signals generated by the low-band subpart TXLB 204 and by the high-band subpart TXHB 203, and to receive from the antenna 101 signals intended to the low-band subpart RXLB 202 and to the high-band subpart RXHB 201. This example corresponds to uplink and downlink carrier aggregations. The first piece of hardware 210 is adapted to bypass the diplexer 212 in the first communication mode and, in the second communication mode, to trap the first expected desensitizing frequency. The second piece of hardware 211 is adapted to bypass the diplexer 212 in the third communication mode and, in the second communication mode, to trap the second expected desensitizing frequency.

The architecture shown in FIG. 6 is a mix of the architectures already presented with regard to FIGS. 2 to 6, and allows performing trapping of two expected desensitizing frequencies in the second communication mode.

FIG. 8 schematically represents a sixth embodiment of the front-end architecture of the transceiver device.

The basis of the architecture shown in FIG. 8 corresponds to the architecture shown in FIG. 6, wherein impedance matching networks 802, 803, 812, 813 have been added. Such impedance matching networks aim at further reducing insertion loss due to the diplexer 212 in at least one embodiment of the present invention. It is illustratively considered hereafter that the impedance matching networks 802, 803, 812, 813 are LC matching networks.

The LC matching network 812 is defined to compensate the fact that the impedance exhibited by the second throw 700 is not truly infinite in the second communication mode, i.e. when the pole of the SPxT switch 102 is connected to the first throw 702, and that some insertion loss may therefore exist for the low-band signals.

Similarly, the LC matching network 802 is defined to compensate the fact that the impedance exhibited by the third throw 701 is not truly infinite in the second communication mode, i.e. when the pole of the SPxT switch 102 is connected to the first throw 702, and that some insertion loss may therefore exist for the high-band signals.

The LC matching network 813 is defined to compensate the fact that the impedance exhibited by the interface of the diplexer 212 dedicated to the low-band signals is not truly infinite in the first communication mode, i.e. when the pole of the SPxT switch 102 is connected to the second throw 702, and that some insertion loss may therefore exist.

Similarly the LC matching network 803 is defined to compensate the fact that the impedance exhibited by the interface of the diplexer 212 dedicated to the high-band signals is not truly infinite in the third communication mode, i.e. when the pole of the SPxT switch 102 is connected to the third throw 702, and that some insertion loss may therefore exist.

Single pole double throw (SPDT) switches may therefore be used to switch from LC matching network 803 to LC matching network 802 and vice-versa, on one hand, and from LC matching network 813 to LC matching network 812 and vice-versa, on the other hand. Alternatively, single pole multiple throw switches could be used to switch between matching networks. This would in example take place when, for any reason, more than two different LC matching networks would be needed.

A first SPDT switch 811 is further added, wherein the single pole of the first SPDT switch 811 is connected to the connection between the diplexer 212 and the low-band duplexer 104, i.e. to the interface of the diplexer 212 dedicated to low-band signals. One throw of the first SP2T switch 811 is connected to the LC matching network 812 and the other throw of the first SP2T switch 811 is connected to the LC matching network 813. When the transceiver device operates in the first communication mode, the first SP2T switch 811 is configured so that the single pole is connected to the LC matching network 812 and, when the transceiver device operates in the second communication mode, the first SPDT switch 811 is configured so that the single pole is connected to the LC matching network 813.

A second SPDT switch 801 is further added, wherein a the single pole of the second SPDT switch 801 is connected to the connection between the diplexer 212 and the high-band duplexer 103, i.e. to the interface of the diplexer 212 dedicated to high-band signals. One throw of the second SP2T switch 801 is connected to the LC matching network 802 and the other throw of the second SP2T switch 801 is connected to the LC matching network 803. When the transceiver device operates in the first communication mode, the second SP2T switch 801 is configured so that the single pole is connected to the LC matching network 802 and, when the transceiver device operates in the second communication mode, the second SP2T switch 801 is configured so that the single pole is connected to the LC matching network 803.

FIG. 8 shows two sets of LC matching networks, one connected to the interface of the diplexer 212 dedicated to the high-band signals and the other one connected to the interface of the diplexer 212 dedicated to the low-band signals. Indeed, FIG. 8 shows an architecture which is derived from the architecture shown in FIG. 6. It shall be understood that such LC matching networks may be implemented in the architectures shown in FIG. 2, 3, 4 or 5. Only one set of LC matching networks is therefore implemented, said set being connected to the interface of the diplexer 212 to which the piece of hardware 210 or 211 is connected.

The invention claimed is:

1. A transceiver device comprising a transmitter part, a receiver part and a multiple throw switch, said transceiver device being adapted to operate in a first communication mode and a second communication mode, characterized in that the second communication mode differs from the first communication mode in that a first frequency desensitizing the receiver part of the transceiver device is expected to be present in the second communication mode;

and in that the multiple throw switch is configured such that a pole is connected to a first throw in the first communication mode and to a second throw in the second communication mode, and in that said transceiver device further comprises:

a wave multiplexing-demultiplexing device connected to the first throw of the multiple throw switch;

a first piece of hardware connected, on one side, to the second throw of the multiple throw switch and, on the other side, to an interface of the wave multiplexing-demultiplexing device dedicated to either high-band signals or to low-band signals, wherein said first piece of hardware is adapted to bypass the wave multiplexing-demultiplexing device in the first communication mode and to trap the first frequency in the second communication mode.

2. A transceiver device according to claim 1, characterized in that said first piece of hardware at least comprises one of a printed wiring board line and an electrical wire and a transmission line and a waveguide and a microwave guide, the length of which is defined as a function of said first frequency.

3. A transceiver device according to claim 1, characterized in that the first frequency is a harmonic of a carrier frequency used by the transmitter part, which equals to a carrier frequency used by the receiver part.

4. A transceiver device according to claim 3, characterized in that said first piece of hardware is connected, on one side, to the second throw of the multiple throw switch and, on the other side, to an interface of the wave multiplexing-demultiplexing device dedicated to low-band signals, in that the transmitter part is adapted to transmit low-band signals in the first and second communication modes, a low-band subpart of the receiver part is adapted to receive low-band signals at least in the first communication mode and a high-band subpart of the receiver part is adapted to receive high-band signals in the second communication mode, said high-band subpart being connected to an interface of the wave multiplexing-demultiplexing device dedicated to high-band signals, and in that said transceiver device further comprises a low-band duplexer connected, on one side, to said interface of the wave multiplexing-demultiplexing device dedicated to low-band signals and, on the other side, to the transmitter part and to the low-band subpart of the receiver part.

5. A transceiver device according to claim 1, characterized in that the first frequency is a carrier frequency used by the transmitter part, which corresponds to a predefined frequency expected to desensitize the receiver part.

6. A transceiver device according to claim 5, characterized in that, the first frequency being a carrier frequency used by the transmitter part corresponding to a spurious response frequency of the receiver part, said first piece of hardware is connected, on one side, to the second throw of the multiple throw switch and, on the other side, to an interface of the wave multiplexing-demultiplexing device dedicated to low-band signals, in that the receiver part is adapted to receive low-band signals in the first and second communication modes, a low-band subpart of the transmitter part is adapted to transmit low-band signals at least in the first communication mode and a high-band subpart of the transmitter part is adapted to transmit high-band signals in the second communication mode, said high-band subpart being connected to an interface of the wave multiplexing-demultiplexing device dedicated to high-band signals, and in that said transceiver device further comprises a low-band duplexer connected, on one side, to said interface of the wave multiplexing-demultiplexing device dedicated to low-band signals and, on the other side, to the transmitter part and to the low-band subpart of the receiver part.

7. A transceiver device according to claim 1, characterized in that the first frequency is a harmonic of a carrier frequency used by the transmitter part, which corresponds to a predefined frequency expected to desensitize the receiver part.

8. A transceiver device according to claim 7, characterized in that, the first frequency being a harmonic of a carrier frequency used by the transmitter part corresponding to a spurious response frequency of the receiver part, said first piece of hardware is connected, on one side, to the second throw of the multiple throw switch and, on the other side, to an interface of the wave multiplexing-demultiplexing device dedicated to high-band signals, in that the transmitter part is adapted to transmit high-band signals in the first and second communication modes, a high-band subpart of the receiver part is adapted to receive high-band signals at least in the first communication mode and a low-band subpart of the receiver part is adapted to receive low-band signals in the second communication mode, said low-band subpart being connected to an interface of the wave multiplexing-demultiplexing device dedicated to low-band signals, and in that said transceiver device further comprises a high-band duplexer connected, on one side, to said interface of the wave multiplexing-demultiplexing device dedicated to high-band signals and, on the other side, to the transmitter part and to the high-band subpart of the receiver part.

9. A transceiver device according to claim 5, characterized in that said first piece of hardware is connected, on one side, to the second throw of the multiple throw switch and, on the other side, to an interface of the wave multiplexing-demultiplexing device dedicated to high-band signals, in that the receiver part is adapted to receive high-band signals in the first and second communication modes, a high-band subpart of the transmitter part is adapted to transmit high-band signals at least in the first communication mode and a low-b and subpart of the transmitter part is adapted to transmit low-band signals in the second communication mode, said low-band subpart being connected to an interface of the wave multiplexing-demultiplexing device dedicated to low-band signals, and in that said transceiver device further comprises a high-band duplexer connected, on one side, to said interface of the wave multiplexing-demultiplexing device dedicated to high-band signals and, on the other side, to the transmitter part and to the high-band subpart of the receiver part.

10. A transceiver device according to claim 1, characterized in that the first frequency is a blocker relative to a predefined frequency expected to desensitize the receiver part.

11. A transceiver device according to claim 10, characterized in that, the first frequency being a blocker laying at a spurious response frequency of the receiver part, said first piece of hardware is connected, on one side, to the second throw of the multiple throw switch and, on the other side, to an interface of the wave multiplexing-demultiplexing device dedicated to low-band signals, in that the transmitter part is adapted to transmit low-band signals in the first and second communication modes, a high-band subpart of the receiver part is adapted to receive high-band signals at least in the first communication mode and a low-band subpart of the receiver part is adapted to receive low-band signals in the second communication mode, said high-band subpart being connected to an interface of the wave multiplexing-demultiplexing device dedicated to high-band signals, and in that said transceiver device further comprises a low-band duplexer connected, on one side, to said interface of the wave multiplexing-demultiplexing device dedicated to low-band signals and, on the other side, to the transmitter part and to the low-band subpart of the receiver part.

12. A transceiver device according to claim 10, characterized in that, the first frequency being a blocker laying at a spurious response frequency of the receiver part, said first piece of hardware is connected, on one side, to the second throw of the multiple throw switch and, on the other side, to an interface of the wave multiplexing-demultiplexing device dedicated to high-band signals, in that the transmitter part is adapted to transmit high-band signals in the first and second communication modes, a low-band subpart of the receiver part is adapted to receive low-band signals at least in the first communication mode and a high-band subpart of the receiver part is adapted to receive high-band signals in the second communication mode, said low-band subpart being connected to an interface of the wave multiplexing-demultiplexing device dedicated to low-band signals, and in that said transceiver device further comprises a high-band duplexer connected, on one side, to said interface of the wave multiplexing-demultiplexing device dedicated to high-band signals and, on the other side, to the transmitter part and to the high-band subpart of the receiver part.

13. A transceiver device according to claim 1, characterized in that said transceiver device further comprises:
   a second multiple throw switch;
   a first impedance matching network connected to one throw of the second multiple throw switch;
   a second impedance matching network connected to the other throw of the second multiple throw switch;
   and in that the second multiple throw switch is configured so that said interface of the wave multiplexing-demultiplexing device dedicated to either high-band signals or to low-band signals is further connected to the first impedance matching network in the first communication mode and to the second impedance matching network in the second communication mode.

14. A transceiver device according to claim 1, characterized in that said transceiver device is adapted to operate in a third communication mode, the second communication mode being distinct from the third communication mode in that a second frequency desensitizing the receiver part of the transceiver device is expected to be present in the second communication mode,
   in that the multiple throw switch is configured such that the pole is connected to a third throw in the third communication mode,
   in that said first piece of hardware is connected, on one side, to the second throw of the multiple throw switch and, on the other side, to an interface of the wave multiplexing-demultiplexing device dedicated to low-band signals;
   and in that said transceiver device further comprises:
      a second piece of hardware connected, on one side, to the third throw of the multiple throw switch and, on the other side, to an interface of the wave multiplexing-demultiplexing device dedicated to either high-band signals, wherein said second piece of hardware is adapted to bypass the wave multiplexing-demultiplexing device in the third communication mode and to trap the second frequency in the second communication mode.

15. A transceiver device according to claim 14, characterized III that said transceiver device further comprises:
   a second multiple throw switch;
   a third multiple throw switch;
   a first impedance matching network connected to one throw of the second multiple throw switch;
   a second impedance matching network connected to another throw of the second multiple throw switch;
   a third impedance matching network connected to one throw of the third multiple throw switch;
   a fourth impedance matching network connected to another throw of the third multiple throw switch;
   and in that the second multiple throw switch is configured so that the interface of the wave multiplexing-demultiplexing device dedicated to low-band signals is further connected to the first impedance matching network in the first communication mode and to the second impedance matching network in the second communication mode,
   and in that the third multiple throw switch is configured so that the interface of the wave multiplexing-demultiplexing device dedicated to high-band signals is further connected to the third impedance matching network in the third communication mode and to the fourth impedance matching network in the second communication mode.

16. A transceiver device according to claim 1, characterized in that said transceiver device is adapted to perform carrier aggregation in the second communication mode.

17. A mobile station, characterized in that it comprises a transceiver device according to claim 1.

* * * * *